Figure 1:
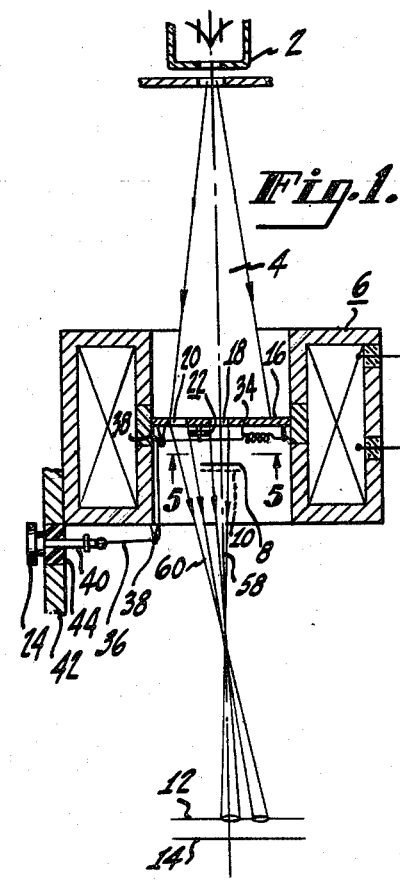

Feb. 3, 1953 S. G. ELLIS 2,627,589
FOCUSING OF ELECTRON OPTICAL APPARATUS
Filed Oct. 30, 1950 2 SHEETS—SHEET 1

INVENTOR
SIDNEY G. ELLIS
BY
ATTORNEY

Feb. 3, 1953     S. G. ELLIS     2,627,589
FOCUSING OF ELECTRON OPTICAL APPARATUS
Filed Oct. 30, 1950     2 SHEETS—SHEET 2
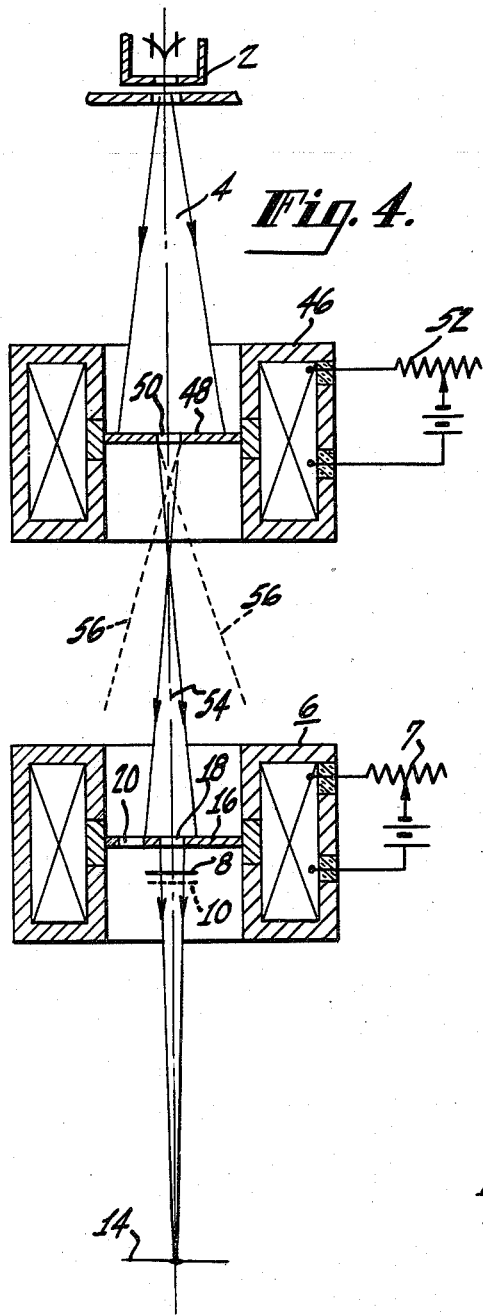
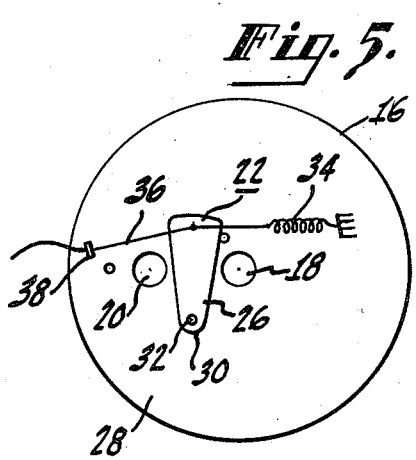
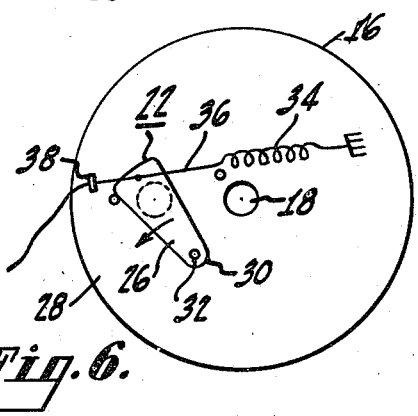
INVENTOR
SIDNEY G. ELLIS
BY
ATTORNEY

UNITED STATES PATENT OFFICE 2,627,589

FOCUSING OF ELECTRON OPTICAL APPARATUS

Sidney G. Ellis, Princeton, N. J., assignor to Radio Corporation of America, a corporation of Delaware Application October 30, 1950, Serial No. 192,840

4 Claims. (Cl. 315—31)

This invention relates to improvements in electron optical apparatus and, more particularly, to electron diffraction cameras.

In its simplest form, an electron optical system which can be utilized as a diffraction camera comprises a high voltage source of electrons, together with means for forming a beam of the electrons, a lens to focus the beam onto a viewing screen or photographic plate, a specimen, and some means for controlling the cross section of the beam at the specimen.

It is necessary to focus the electron beam in order to get a sharp diffraction pattern on the viewing screen or plate. There have been three general methods in use for focussing electron diffraction cameras. These are:

(1) By taking a through focal series,
(2) By changing the strength of the lens until the observed pattern is as sharp as possible, and
(3) By setting the strength of the lens to a value previously determined for the camera.

All three of the previously used methods have certain disadvantages. The first requires the use of a number of photographic plates and is time-consuming. The second can only be used where the pattern can be brought to a sharp focus. This is not always satisfactory in a diffraction camera because the specimen does not always provide sharp rings. The third requires the reproduction of standard conditions in the instrument. This may prove difficult with a multilens system.

The present invention is an improved method and apparatus for focussing an electron diffraction camera. The improved apparatus comprises a diaphragm positioned adjacent to the principal focussing lens of the instrument. The diaphragm has two apertures therein for the simultaneous passage of different portions of the electron beam. One of the apertures is positioned to pass electrons adjacent the central axis of the lens. The other aperture is positioned off-center with respect to the central axis of the lens. Means is also provided to open and close the other aperture or to otherwise permit electrons to pass through the off-center aperture at some times but not at other times.

The improved method of the present invention comprises passing two different portions of the electron beam through two apertures, one of which passes electrons adjacent the central axis of the lens and the other of which passes electrons through a part of the lens off-center with respect to its central axis. These two portions of the beam will form two distinct luminous spots on the viewing screen when the instrument is not focussed properly. The method includes changing the strength of the lens until the two spots either coincide or are separated a predetermined distance.

One object of the present invention is to provide an improved electron optical apparatus.

Another object of the invention is to provide an electron diffraction camera having improved focussing means.

Another object of the invention is to provide improved means for focussing an electron optical apparatus.

Another object of the invention is to provide an improved method of focussing an electron optical apparatus.

Still another object of the invention is to provide an improved means of focussing an electron diffraction camera.

Figure 2:
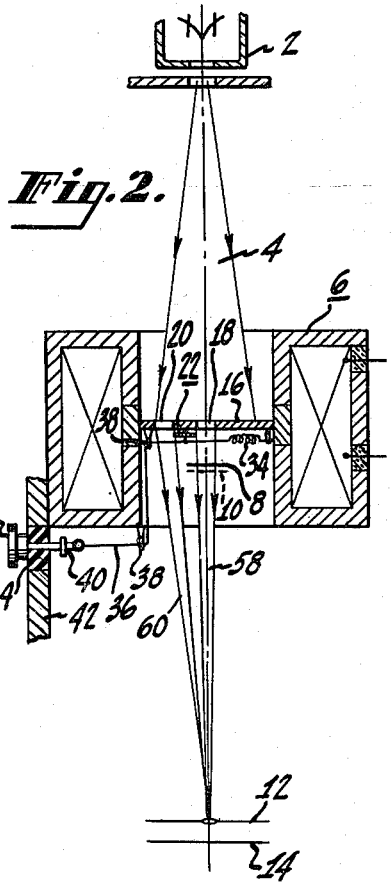
Figure 3:
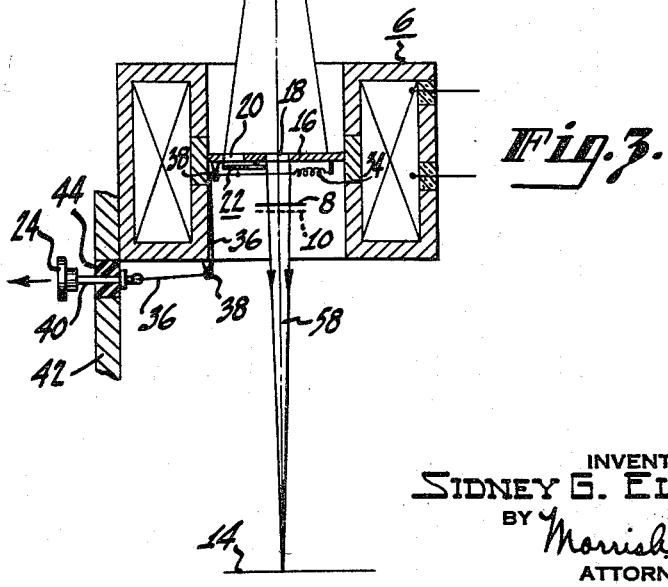

These and other objects will be more apparent and the invention will be better understood from the following detail description when read in connection with the accompanying drawings of which:

Figure 1 is a partly diagrammatic sectional view of an electron optical apparatus including the double aperture of the present invention with the electron beam not perfectly focussed, Figure 2 is a view similar to that of Figure 1 but with the beam properly focussed, Figure 3 is a view similar to that of Figure 1 or 2 but with the off-center aperture closed, Figure 4 is a partly diagrammatic sectional view of electron optical apparatus as shown in Figure 3 but with a second electron lens for controlling the cross-section of the beam at the lower lens of the diaphragm, Figure 5 is a plan view taken along the line 5—5 of Figure 1, looking upward at the lower side of the lens diaphragm, and Figure 6 is a view similar to that of Figure 5 but with the off-center aperture closed, as in Figure 3.

Referring now to the figures wherein like parts have been designated with the same numerals, a simple form of diffraction camera may include a conventional source of electrons, together with means for forming a beam of electrons, indicated generally at 2. The electron beam 4 thus formed diverges and is focussed by lens 6 having conventional control means 7 for varying the lens current. At least a part of the beam travels through a specimen 8 on a specimen holder 10 and the diffraction pattern, caused by diffraction of electrons passing through the specimen, appears on a luminescent viewing screen, 12, positioned above a photographic plate 14.

In using an electron diffraction camera, it is desirable to inspect a very small portion of the specimen at any one time in order to get a sharp diffraction pattern. For this purpose, a diaphragm 16 is provided in some position adjacent the lens to limit the diameter of that part of the electron beam passing through the specimen. By "adjacent" is meant either within the lens or close to it either above the lens or below it. The diaphragm normally has a central opening 18 therein to permit passage of electrons adjacent the central axis of the lens. In accordance with the present invention, the diaphragm is also provided with a second aperture 20 positioned to pass electrons in a part of the beam which is off-center with respect to the central axis of the lens.

This second aperture may conveniently be placed about half way between the central aperture and the outer edge of the diaphragm. It is desirable, although not absolutely necessary, to place this second aperture sufficiently far from the first aperture to get a usable separation of spots but not so close to the outer edge of the diaphragm to be seriously influenced by the usual lens aberrations.

In use, when the instrument has been properly focussed and a specimen is in place and is being examined, the second aperture is closed as by a movable shutter 22, having an exterior control knob 24 so that electrons cannot pass through the aperture. Referring now to Figures 4 and 5, the shutter 22 may comprise a rotatable blade 26 roughly having the shape of an isosceles triangle with the altitude about twice as long as the base. The blade is mounted on the under side 28 of the diaphragm 16 so that it may be rotated about its apex 30. The apex of the blade is mounted for rotation on a pin 32 attached to the under side of the diaphragm 16. The pin is located with respect to the apertures so that the blade may be moved to and fro across the off-center aperture 20 without interfering with the beam passing through the central aperture 18.

The mechanism for rotating the shutter blade includes a spring 34 attached to the freely swinging end of the blade. The spring is arranged to normally bias the shutter in "open position," that is, with the off-center aperture uncovered. In order to rotate the blade to its "closed" position, that is, covering the off-center aperture, a flexible wire 36 is run from the freely swinging end of the blade through eyelets 38, to the inner end of a pull-rod 40 extending through the wall 42 of the instrument. The pull-rod passes through the instrument wall within a tightly fitting sleeve 44 of flexible material, such as rubber, so as not to let air into the instrument column. The knob 24 is attached to the outer end of the pull-rod. When the knob is pulled outward, the shutter is rotated so that it covers the off-center aperture. Friction between the pull-rod and the sleeve 44 is sufficient to hold the shutter in position against the opposing action of the spring and air pressure on the rod 40. When the knob is pushed inward, the spring pulls the shutter to its "open" position. All the materials used in making the aperture and the shutter mechanism must be non-magnetic.

Instead of a mechanically operated shutter, which opens and closes the off-center aperture, electronic control means may be employed for controlling the passage of part of the electron beam through this aperture. Referring now to Figure 4, a second lens 46 may be placed between the electron source 2 and the focussing lens 6. This lens also includes a diaphragm 48, which has a central aperture 50 and conventional control means 52 for varying the strength of the lens. By varying the strength of this lens the cross sectional area of that part of the electron beam 54, which has emerged from the aperture 50, at a point just above the diaphragm 16, may be controlled. For example, the cross sectional area may be decreased so that the beam does not spread sufficiently to include the off-center aperture 20 in the focussing lens 6. On the other hand, the strength of the second lens 46 may be increased sufficiently to cause the cross sectional area of that part of the electron beam immediately above the diaphragm 16 to increase as shown by the dotted line 56, so that part of the beam passes through the off-center aperture.

The improved method of focussing an electron optical apparatus in accordance with the present invention is as follows. Referring to Figure 1, usually, after inserting a specimen in the path of the beam, two different portions of the beam, as 58 and 60, are passed through the separate apertures, 18 and 20, respectively, in the diaphragm. One of these beam portions is adjacent the central axis of the lens, the other is off-center. When these two portions of the beam strike the viewing screen 12, which comprises a layer of an electron excitable phosphor on a supporting base, two luminous spots are formed if the instrument is not in perfect focus. Perfect focussing is indicated when the spots either coincide, as shown in Figure 2, or are separated a standard, predetermined distance. In order to cause the spot due to that part of the beam passing through the off-center aperture 20 to move toward the other spot, it is necessary to vary the strength of the lens. This is done by means of the conventional controls 7 for varying the current through the lens. Turning the current control moves the spot related to beam 60 with respect to the spot caused by the central portion of the beam. The controls are adjusted until the two spots coincide.

A photograph may then be taken of the diffraction pattern by closing the off-center aperture and moving the viewing screen 12 to one side so that the photographic plate 14 may be exposed. The previous operations are usually carried out with the specimen in place. Only the central electron beam passes through the specimen. When the viewing screen and plate are very close together, the focussing of the spots on the viewing screen will be accurate enough to be used for the photographic plate. However, if the viewing screen and photographic plate are separated by an appreciable distance, if the two spots are made to coincide on the luminescent viewing screen, they will not coincide at the lower level of the photographic plate. This indicates that the plate is not in focus. This may be corrected for, however, by taking into consideration the known distance between the viewing screen and plate and adjusting the lens current controls so that the spots appear slightly separated on the screen. The distance of separation to be permitted will depend upon the separation of plate and screen. Alternatively, the spots may be made to coincide on the screen and then the lens current may be reduced by an amount determined from a previous experiment.

If, as a further refinement, one considers the effect of the spherical aberration of the lens, it will be seen that when the two beams 58 and 60 coincide at the viewing screen the camera actually focusses the central beam 58 at a lower level, and is, therefore, in focus nearer to the photographic plate. By making the two beams coincide at the plate, and then changing the lens current by a previously determined amount, the effect of the spherical aberration is taken care of in the focussing procedure.

There has thus been described an improved method of focussing an electron optical apparatus, which method is particularly useful in connection with electron diffraction cameras. There has also been described an improved diaphragm for use in electron optical apparatus such as diffraction cameras.

I claim as my invention:

1. An electron optical apparatus including means for forming a beam of electrons, a lens for focussing said beam, means for changing the strength of said lens, and a viewing screen, a diaphragm positioned adjacent said lens, said diaphragm having two apertures normally permitting simultaneous passage of electrons in different parts of said beam, one of said apertures being positioned to pass electrons adjacent the central axis of said lens, the other aperture being positioned off-center with respect to said central axis, and control means for preventing electrons from passing through said other aperture when desired.

2. An apparatus according to claim 1 in which said other aperture is positioned about half way between said one aperture and the outer periphery of said diaphragm.

3. An electron diffraction camera comprising means for forming a beam of electrons, a lens for focussing said beam, means for changing the strength of said lens, a viewing screen, a diaphragm positioned adjacent said lens, a central aperture in said diaphragm, an off-center aperture in said diaphragm, and means for permitting passage and for shutting off passage of electrons through said off-center aperture.

4. Apparatus according to claim 3 in which said last mentioned means is a shutter and includes means for opening and closing said shutter.

SIDNEY G. ELLIS.

REFERENCES CITED

The following references are of record in the file of this patent:

UNITED STATES PATENTS

| Number | Name | Date |
| --- | --- | --- |
| 2,295,403 | Hillier | Sept. 8, 1942 |
| 2,305,761 | Borries et al. | Dec. 22, 1942 |
| 2,443,107 | Hillier | June 8, 1948 |
| 2,445,676 | Hillier | Dec. 7, 1948 |